United States Patent Office 3,244,652
Patented Apr. 5, 1966

3,244,652
STABLE POLYETHYLENE LATICES
Arthur F. Helin and Gerald J. Mantell, Kansas City, Mo., assignors, by mesne assignments, to Gulf Oil Corporation, Pittsburgh, Pa., a corporation of Pennsylvania
No Drawing. Filed Apr. 21, 1961, Ser. No. 104,763
16 Claims. (Cl. 260—23)

This invention relates to the emulsion polymerization of ethylene to form stable polyethylene latices, and to the stable polyethylene latices so formed.

The development of polyethylene latices sufficiently stable to be of practical industrial and commercial significance is a goal that has long been sought in the chemical art. Aqueous emulsified polymers are of great utility in many industrial operations, and a wide variety of polymers other than polyethylene has long been available commercially in the form of stable aqueous latices.

Indicative of the desirability with which the art views stable polyethylene latices is the considerable effort and experimentation heretofore brought to bear on the development of these materials. Although the emulsion polymerization of ethylene was observed as early as 1939, and although polyethylene dispersions may have been prepared in the prior art, an excellent criterion of the stability of these dispersions, or the lack thereof, is that, until recently, no such polyethylene dispersions have met the practical demands of the market place.

Recently, the art has developed certain emulsifiable polyethylenes and emulsions prepared therefrom which are commercially acceptable from the viewpoint of stability. These emulsions are not obtained directly by an emulsion polymerization process, but are obtained by the emulsification of emulsifiable pre-formed polyethylene solids.

The pre-formed solids are produced by telomerization of ethylene and oxidation of the telomer or by thermal degradation of high molecular weight polyethylenes to low molecular weight products, which are then oxidized, as disclosed in U.S. Patents 2,964,487 and 2,928,797. The polymers contain oxygenated hydrophilic groups, such as carboxy and/or carbonyl and/or hydroxy groups requisite to their adaptability to forming emulsions. Both the solids of these types and the emulsions prepared therefrom have numerous disadvantages.

Thus, these emulsifiable polymers are restricted to materials having a molecular weight of about 5000 or less, usually about 3000 or less, which limitation is set in part by the methods by which emulsions are prepared from the emulsifiable polyethylene solids. Generally, this preparation requires fusion of the oxidized solids, and materials of molecular weight above about 5000 are too viscous to handle as a melt. Indeed, for dispersion of solids of this type having molecular weights within the upper regions of the range specified, special equipment permitting emulsification under pressure may be required. Alternatively, such higher molecular weight emulsifiable-polyethylenes must be emulsified by combination with a solvent and subsequent dispersion in water. Both these techniques are inconvenient, and the latter, particularly, leads to the formation of particle sizes for the dispersion polyethylene solids which are undesirably large for many practical applications.

Generally, emulsions of concentrations larger than about 20 to 30% solids cannot be prepared from the prior art oxidized polyethylenes. The emulsions which can be prepared are expensive in requiring relatively large amounts of emulsifier (e.g., 25–30% by weight of the polyethylene solids).

Further, the oxygenated polyethylene materials of the prior art have a disagreeable odor which is inherent in the polymer and which renders emulsions thereof unsuitable in numerous applications such as in the production of food wrappings.

Finally, emulsions prepared from these prior art emulsifiable polyethylene solids often have a yellowish tinge. Although white emulsifiable polyethylenes can also be obtained, it has been noted that these polyethylene solids tend to vary in their color, indicating that color control of the materials is difficult.

According to the present invention, stable polyethylene latices of commercial and practical significance as polish components and textile treating agents, for example, can be produced directly by an emulsion polymerization of ethylene. These latices can be obtained from the reactor containing up to about 30% by weight of solids and can easily be concentrated to latices containing a minimum of 40% by weight of solids and up to about 50% by weight of solids or higher.

The polyethylene solids contained therein are substantially oxygen-free (less than about 1%), substantially sulfur-free (less than about 0.1%), non-telomerized materials, ranging in molecular weight from between about 7000 to about 30,000 or 40,000. They are of intermediate density, between about 0.91–0.93 gram/cm.$^3$. They are nonlinear polyethylenes with a methyl group content of about 30 per thousand carbon atoms, which is a measure of the degree of branching. Surprisingly, the crystallinity, hardness, and density of the polyethylenes are higher, for this degree of branching, than is observed in polyethylenes produced by other polymerization processes. Nicely flexible polyethylene bodies can be molded from solids recovered from the latices. The solids have an inherent viscosity between about 0.25 and about 1.1 and have a crystalline melting point of about 80°–115° C. The solids and the latices in which they are contained have no detectable odor, and are uniformly white in color. Those latices containing very small particles are translucent and have a bluish cast due to the Tyndall effect.

These solids are present in the stable latices of the invention as particles of an average size between about 0.02 micron to about 0.5 micron. Materials of particular commercial significance, for example for the preparation of wax polishes, are those in which the average particle size is between about 0.02 micron to about 0.1 micron. These particle sizes are unusually small. The total surface of the particles in the latex may be between about 30% and about 70% covered with the emulsifying agent used in the preparation of the latex. This emulsifying agent can be present in amounts as small as 0.7% by weight of the latex, i.e., only about 3.5% by weight of the emulsified solids.

The latices produced by the methods of the invention have a pH greater than about 8.5. If concentrated to a solids content of 40%, they have a surface tension between about 40 and 70 dynes/cm., and a viscosity of less than about 500 centipoises, generally quite low, i.e., about 60 centipoises. It is of considerable significance that comparatively fluid materials of this type containing polymer of small particle size can be made. If the commercially available oxidized emulsifiable polyethylene solids are dispersed to produce emulsions approaching this concentration, the resulting emulsions are too thick for easy application in such uses as surface coating.

However, the most striking and utile characteristic of the latices of the invention is their stability. This term, particularly in view of its vague use in the prior art, begs for a more precise definition.

At least six types of stability desirable in a polyethylene latex can be outlined. First, such latices should be reactor stable. That is, the latices should be capable of being produced in an emulsion polymerization in the form of a homogeneous product substantially free of coagulum and containing up to about 30%, preferably at least 20%, of polyethylene solids by weight of the product.

Second, such latices should be strip stable. That is, the product from the reactor should be susceptible to concentration by removal of excess water and any solvent which may be present to produce commercially interesting concentrated latices containing a high concentration of solids, preferably at least 40% by weight. During this stripping step, there should be substantially no formation of floc, or only such slight formation, preferably less than 1%, as will permit easy filtration of such floc from the concentrated materials.

Another criterion of stability is mechanical stability. In many important industrial applications, for example coating processes, latices may be subjected to agitation or to frictional forces. Under such mechanical stress, the emulsified particles in a latex may tend to coalesce and form curdy agglomerates. A suitable test for mechanical stability in a polyethylene latex is the subjection of the latex to agitation for 1 minute in a Waring-type blender run at a rate of about 10,000 revolutions per minute. A latex containing about 20% solids after subjection to such agitation should be uncoagulated and capable of being diluted with water without separation of solids.

Still another criterion for stability is freeze-thaw stability. To test such stability, a latex sample is frozen and then thawed one or several times. If the latex is freeze-thaw stable, a latex with the initial properties of the unfrozen material is recovered after the first or subsequent cycles. In some cases, a product visibly similar to the unfrozen latex can be obtained, but the undesirable formation of solids can be detected by mixing the thawed latex with water. Latices which are only partially freeze-thaw stable will form polyethylene solids detectable on dilution of the thawed latex with water. Freeze-thaw stability is of importance in shipping latices, since the latices may be subjected to temperature extremes.

Also, latices may be characterized as to their chemical stability. In particular, latices produced with the aid of non-ionic emulsifiers will be stable to acids and polyvalent metal cations added thereto, whereas latices produced with anionic emulsifiers will be broken by the reaction of acidic or cationic substances with the emulsifier employed. Only this very restricted definition of "chemical stability" is employed in this specification.

Finally, perhaps the most important stability property, but also the one least susceptible to precise definition, is shelf stability. Obviously, those products having the greatest resistance to creaming, gelling, or thickening will be most acceptable for marketing.

For use in such processes as textile finishing, where the essential character of a polyethylene latex is destroyed, as by drying, in putting the latex to use, a minimum shelf stability of 60 days is desirable for transportation and storage in the manufacturer's and consumer's inventory. In other uses, such as in polishes, latex shelf stability of 6 months or a year or more is desirable. The shelf stable latices of the invention can be directly prepared by aqueous emulsion polymerization to meet all these requirements. Latices made according to the specification have not gelled, thickened, or creamed in nearly two years. Small flakes which may form due to evaporation of surface portions of the stored latices do not interfere with the use of the latices in such products as polishes since the flakes can easily be removed by filtration.

Characterizing the latices of the present invention by these criteria, they are not chemically stable nor freeze-thaw stable. They do not possess mechanical stability sufficient to pass the 1-minute test outlined, but may have limited mechanical stability adequate for many purposes. They are reactor stable, strip stable, and shelf stable.

The latices described above are directly prepared by emulsion polymerization of ethylene at polymerization temperatures and pressures in a charge mixture comprising water, an anionic emulsifying agent, a pH adjuster in some cases, an optional solvent, and a polymerization initiator. Although the reagents and operating conditions pertinent to the present invention may have in part been individually disclosed in the prior art, the formation of the novel stable emulsions herein described is apparently the result of the heretofore undiscovered critical combination of factors disclosed herein.

The ingredients of the charge mixture generally total about 104–106% by weight of the combined water and solvent therein. As known to those skilled in the art of emulsion polymerization, a pure, deionized, distilled, or mineral-free water free of ions such as copper or iron ions, which may disturb the catalyst, or heavy metal ions which may react with the emulsifiers to form insolubles, is suitably used.

The emulsifiers employed are of three types: (1) the salts of saturated fatty acids, in particular the potassium salts of fatty acids having 12 to 18 carbon atoms, such as potassium stearate, myristate, and laurate; (2) salts, particularly sodium salts, of sulfates of fatty alcohols having 12–18 carbon atoms, or mixtures thereof; and (3) salts, particularly sodium salts, of sulfates of ethoxylated fatty alcohols having about 12–18 carbon atoms and an average number of ethoxy groups between 1 and 5. Some of these emulsifiers are commercially available, for example under the trade names "Duponol C," "Duponol WAQE," "Duponol ME," etc., which contain primarily sodium sulfates of $C_{12}$ alcohols, "Sipex TDS," which is sodium tridecyl alcohol sulfate, and "Sipex ESY," which is the sodium salt of ethoxylated lauryl sulfate having an average of about 1.5 ethoxy groups.

These emulsifiers are employed in amounts of less than about 9% by weight of the aqueous phase used in the emulsion polymerization, suitably between about 0.9% and about 9% by weight. These figures, however, are for the extremes in particle size, solids concentration, and degree of saturation earlier mentioned. Generally, the emulsifier is present as between about 1.2% and about 3% by weight of the aqueous phase. The emulsifiers may be added to the aqueous phase as salts or in the form of alkali and acid components in quantities suitable for the in situ formation of the salts.

A pH adjuster is present in the aqueous phase to prevent displacement, by stronger acids, of the weak acid component of the fatty acid soaps. The pH adjusters employed in the polymerization, if these soap emulsifiers are used, are those which in nature and amount used will result in a pH of at least about 8.5 in the product removed from the reactor. Since acid is formed during the polymerization, the pH at the time polymerization is initiated is preferably somewhat higher, suitably about 10.5. Alkaline substances giving a pH of about 10.5 are, for example, potassium phosphates, such as tripotassium phosphate, and potassium carbonate, which substances are also buffers. To give the desired pH values, tripotassium phosphate, for example, is added to the aqueous medium in amounts between about 0.25% and about 0.7% by weight. To maintain the pH, non-buffering alkalis, such as KOH, may be added to the aqueous medium during the course of the reaction. If alkyl sulfate detergents are used as the emulsifiers, the pH adjuster may be omitted, since these materials are acid-stable to a pH of about 4.

Tertiary butanol is optionally included in the aqueous phase in the polymerization and, in addition to favoring the production of stable latices, has an influence on the molecular weight of the polymer, the particle size obtained, and the rate of the polymerization. Other alcohols employed as solvents, including other butanols and tertiary amyl alcohol, do not result in the formation of stable polyethylene products as herein defined. It is believed that the active hydrogen atoms present on carbon atoms adjacent to hydroxy groups in other alcohols are subject to entry into free radical polymerization reactions interfering with the regular course of free radical polymerization involving ethylene.

The influence of tertiary butanol on the rate of the polymerization and the molecular weight of the polymer formed are apparently linked to an increase in solubility of ethylene in emulsified polyethylene when tertiary butanol is present. Thus, it is noted that ethylene solubility in water is not appreciably increased by the addition of tertiary butanol to an aqueous solution; however, when polyethylene is also present as in a latex, the solubility of ethylene in the resulting mixture increases surprisingly when tertiary butanol is added. The presence of tertiary butanol, thus, favorably increases the solubility of ethylene in polyethylene, permitting higher amounts of ethylene to be present at a given time during the course of the reaction and thus speeding the rate of the reaction when the other reaction conditions specified herein also prevail. From the point of view of rate, systems containing tertiary butyl alcohol show a polymerization rate slightly greater than that in a comparable system not containing tertiary butanol.

Similarly, the greater concentration of monomeric ethylene in the polymerization mixtures of the present invention appears responsible for the higher molecular weights usually observed in polyethylenes obtained when tertiary butanol is present, although the amount of initiator employed also strongly influences this property. Thus, in a series of experiments it was determined that under a variety of conditions the molecular weight of polyethylenes produced in the presence of 5% of t-butanol by weight of aqueous medium averaged about 16,000. A similar set of comparable experiments, but in which the aqueous medium contained 10% tertiary butanol by weight of aqueous medium, produced polyethylenes having an average molecular weight of about 19,500.

Tertiary butanol may also act in the polymerization mixtures to reduce the surface tension of the mixtures, taking over the role played normally by the emulsifier as the size of the polyethylene particles in the latex grows and these growing particles become unsaturated with respect to emulsifier. By maintaining a fairly constant surface tension in the aqueous polymerization medium, a fairly constant rate of polymerization is obtained, permitting polymerization to high solids content in the latex in short periods of time.

The influence of tertiary butanol on particle size is apparently due to a difference in the critical micelle concentration of the emulsifier in the system water-tertiary butanol, as compared with water alone. Apparently the emulsifier has a higher critical micelle concentration in the water-alcohol system than in water alone so that, if equal amounts of emulsifier are added to both systems, the water-alcohol system contains a smaller number of micelles when polymerization is initiated, and fewer particles are produced in this system as compared with a purely aqueous system. Since the number of particles is smaller than in the purely aqueous system, the size of the particles is greater at a comparable total solids content.

Tertiary butanol is suitably employed in the aqueous polymerization media in amounts of up to about 20–25% by weight, including from about 5% to about 20–25%. If t-butanol is omitted entirely from the polymerization medium, the molecular weight of the polymer solids and the particle size tends to the lower portions of the ranges earlier specified. The rate of the reaction will also decrease.

Potassium and sodium persulfates are the water-soluble free radical initiators employed according to the invention. Potassium persulfate is preferred for use with the potassium fatty acid soaps. The attempted use of peroxides or redox systems as initiators did not lead to formation of stable latices.

The initiator is initially present in the aqueous medium in a maximum amount of about 0.5 percent by weight of aqueous phase. It is surprising that excellently stable polyethylene latices can be obtained when the initiator concentration is as low as about 0.06 percent by weight of aqueous phase. Such small amounts of initiator give acceptable polymerization rates, and give desirable high molecular weight products in the upper portions of the molecular weight range mentioned before.

In view of the small amounts of initiator employed, the polyethylene product is substantially sulfur free, that is containing less than about 0.1 percent by weight of sulfur. This is in contrast to the first emulsified polyethylene products known to the art, which were prepared with large amounts of persulfate initiator. Whatever stability these prior art emulsions possessed is in part attributable to the presence of numerous hydrophilic sulfate groups in the resulting polymers. However, these prior art polymers are undesirably highly sensitive to water, and precipitated solids tend readily to re-emulsify when wet. Hydrophobic polyethylenes must be prepared by hydrolysis of the emulsion solids. The hydrolyzed hydrophobic solids are, however, not re-emulsifiable.

By the present process, emulsified hydrophobic polyethylenes are produced directly.

In carrying out the polymerization process of the present invention, water, pH adjuster (if present), emulsifier, and optional tertiary butanol are combined, in any order, in the amounts or proportions recited. The components are mixed in, or the pre-mixed aqueous phase is introduced into, a suitable pressure reactor in which fairly vigorous agitation of the contents is possible either by motion of the reactor or by agitating means disposed therein. The reactor is suitably made of a corrosion-resistant material such as stainless steel, or is equipped with a corrosion-resistant lining such as of glass or stainless steel. The reactor is then flushed with polymerization grade (99.8+ percent pure) ethylene, preferably material containing less than 10–25 p.p.m. $O_2$, remove gaseous oxygen from the system.

The reactor is heated to operating temperature, between about 70° to about 100° C., and the initiator is introduced into the reactor, conveniently dissolved in a portion of the water component of the aqueous medium.

High pressure polymerization grade ethylene at a minimum pressure of about 2500 pounds per square inch is introduced into the reactor. Stable polyethylene latices of the type hereinbefore defined have been obtained using ethylene pressures of up to at least 5000 pounds per square inch, and ethylene is added to the reactor during the polymerization to maintain a pressure between about 2500 p.s.i. and at least 5000 p.s.i. The reaction proceeds at the temperatures and pressures indicated, with constant vigorous agitation of the liquid contents in the reactor.

With t-butanol present, polymerization to a latex having a solids content of about 20–30 percent can be completed in surprisingly short time periods of less than about 4 hours, generally about 2 to 4 hours. After this time, the reactor is discharged, the product being a polyethylene latex having the stability properties hereinbefore defined.

Although the amount of initiator initially introduced into the reactor may be sufficient in quantity for reaching the 20–30 percent solids content desired in the final product, a sample of the reactor contents can be withdrawn from time to time and solids content plotted as a function of time. A leveling off of the plot of solids content, indicating that the reaction is slowing down as the initiator is depleted by thermal decomposition, may make desirable the addition of additional initiator, usually added in small increments of about one quarter the original dose introduced into the reactor. Such minor additions are made as needed to reach the desired final solids content.

The latex products withdrawn from the reactor are of utility per se in applications where the relatively low solids content and/or possible presence of t-butanol are not objectionable. The materials are also useful as an intermediate in the production of latices free of t-butanol and having a high solids content. The latex products from the reactor contain polyethylene solids as hereinbefore described in an aqueous medium comprising water and optional t-butanol in the same relative proportions as employed in the emulsion polymerization step, emulsifier in minor amounts in equilibrium with the emulsifier adsorbed on the latex solids, and minor amounts of unidentified acid thermal decomposition products (largely sulfates) of the persulfate initiator. If an alkaline pH adjuster is employed, neutralization products of the pH adjuster and the acid decomposition products of the persulfate may be present, together with the unneutralized pH adjuster maintaining the pH of the latex above about pH 8.5.

To strip any t-butanol from the reactor product and/or to concentrate the reactor product by removal of water, the product is treated at temperatures between room temperature (about 25° C.) and about 60° C. at subatmospheric pressure to evaporate the alcohol and water. Pressures of about 10–100 mm. Hg are suitably employed. The stripped latex contains polyethylene solids of the type described in an aqueous medium like that described above for the reactor product, except that the content of t-butanol is reduced to values below those originally present, including substantially no butanol.

A better understanding of the invention and its many advantages can be had by reference to the following specific examples given by way of illustration.

Example 1

An 18-gallon high pressure stainless steel autoclave equipped with a propeller-type agitator was charged with a solution composed of 70 lb. (85.5 parts) of distilled water, 7.8 lb. (9.5 parts) of tertiary butanol, 2.38 lb. (2.90 parts) of myristic acid, 0.58 lb. (0.71 part) of potassium hydroxide and 0.34 lb (0.42 part) of tripotassium phosphate. The autoclave was heated to 80° C. and purged by flushing for 1 minute with a continuous stream of ethylene gas delivered from a compressor. After purging, the vent valves were closed, the agitator was starated and polymerization grade ethylene containing less than 25 p.p.m. of oxygen was pumped in until the pressure reached 1500 lb./sq. in. A solution consisting of 0.066 lb. (0.08 part) of potassium persulfate dissolved in 4.1 lb. (5 parts) of water was pumped in and the pressure was increased to 3000 lb./sq. in. by pumping in more ethylene. The pressure was maintained at 3000 lb./sq. in. by an automatically operated control valve supplying ethylene from the compressor, the excess ethylene being recycled to the compressor inlet. The temperature was also automatically maintained at a constant level of 80° C. by means of a thermostatically controlled internal cooling coil and an external heating jacket. During the course of the reaction samples of the reactor contents were removed at 30 minute intervals and the total solids content was determined by evaporation using a moisture balance. When the total solids content reached 25.4 percent the polymerization was terminated by shutting off the ethylene supply, stopping the agitator and discharging the contents of the autoclave into a vented receiving vessel at atmospheric pressure. The total reaction time was 1.77 hours. The product was a fluid, milky latex with no sediment or visible solid particles present. It was stripped of tertiary butanol and concentrated to 36.2 percent total solids by exaporation in portions using a rotating vacuum evaporator at a pressure of about 100 mm. of mercury. The stripped product was a fluid milky latex exhibiting a viscosity of 37 centipoises at 25° C. determined with a Brookfield viscometer using spindle No. 1 at 60 r.p.m. The pH was 9.3, the density was 0.9658 g./ml. and the suface tension was 69.2 dynes/cm. The average particle diameter of this latex determined by a soap titration procedure was 0.028 micron. Polymer recovered from the latex exhibited the following properties: density, 0.9224 g./ml.; melt index, 1600; inherent viscosity, 0.477, corresponding to a molecular weight of 14,000. An infrared spectrogram showed that there were 30 methyl groups present per 1000 carbon atoms. The latex shows no gelling, creaming, or thickening in a period of 10 months since its preparation.

Example 2

The autoclave described in Example 1 was charged with a solution composed of 64 lb. (80 parts) of distilled water, 12 lb. (15 parts) of tertiary butanol, 1.24 lb. (1.55 parts) of lauric acid, 0.42 lb. (0.52 part) of potassium hydroxide and 0.4 lb. (0.5 part) of tripotassium phosphate. The purging and operating procedures were the same as those described in Example 1. The initial persulfate solution consisted of 0.128 lb. (0.16 part) of potassium persulfate dissolved in 4 lb. (5 parts) of water and an incremental charge amounting to about 20 percent of the initial solution was pumped in in about 5 min. The pressure was held at 2500 lb./sq. in. and the temperature at 80° C. during the polymerization. After 7.6 hours the charge had attained a total solids content of 23.8% and it was discharged. The product was a white fluid latex containing no cream or visible solid particles. A portion of this latex was blended with latex from a duplicate batch and the blend was stripped of t-butanol and concentrated to 31.2 percent total solids. The stripped material had a pH of 9.9, a surface tension of 37.8 dynes/cm., and has not thickened, gelled, or creamed during a period of 15 months since its preparation. The polymer recovered from the latex before blending had the following properties: melt index, 80; inherent viscosity, 0.920, corresponding to a molecular weight of 28,400.

Example 3

A 1-gallon stainless steel autoclave equipped with a magnetically operated dasher-type agitator was loaded with a solution composed of 1600 g. (85 parts) of distilled water, 300 g. (15 parts) of tertiary butanol, 12.5 g. (0.52 part) of potassium hydroxide, 44.2 g. (2.2 parts) of stearic acid and 10 g. (0.5 part) of tripotassium phosphate. The autoclave was sealed and the head space was purged by evacuating, then filling with ethylene from a cylinder to 100 lb./sq. in. pressure, venting off the ethylene to atmospheric pressure and repeating the filling and venting operation. Then ethylene containing less than 25 p.p.m. of oxygen was admitted from a high pressure reservoir to a pressure of 1800 lb./sq. in. The agitator was started, electric heaters external to the autoclave were turned on and the charge was heated to 80° C. The pressure was adjusted to 3000 lb./sq. in. and 100 ml. of a solution prepared by dissolving 8 g. of potassium persulfate in 200 g. of distilled water was pumped in corresponding to 0.20 part of potassium persulfate in the charge. The pressure rose to 3350 lb./sq. in. The reaction started immediately. Pressure was maintained between 2600 and 3000 lb./sq. in. by admitting ethylene intermittently as required. The temperature was maintained above 78° C. by the electric heaters and reached a maximum of 92° C. during the first 45 minutes of polymerization as a result of the exothermic character of the reaction. At about 1.8 hours an additional 25 ml. of persulfate solution was added to sustain the reaction rate. Samples were withdrawn at intervals during the polymerization and the total solids content was determined. When the total solids content reached 25% after 5.6 hours, the reaction was terminated by shutting off the ethylene supply, turning off the heaters and cooling the charge by running cold water through internal coils. The ethylene remaining in the autoclave was vented off slowly until the pressure dropped to 300 lb./sq. in. and the latex was then discharged through a dip tube into an open container. The product was a translucent, fluid latex containing no visible solid material. It was combined with 4 other batches prepared by essentially the same procedure and the blend was stripped and concentrated to 30.0 percent total solids in a 12.1 flask at a pressure of 70–140 mm. of mercury. The product was a fluid, smooth white latex which had a pH of 10.1. After 20 months' storage the latex shows no gelling, thickening, or creaming.

Example 4

Using the equipment and procedures described in Example 3, the reactor was loaded with a solution composed of 1458 g. (73 parts) of distilled water, 300 g. (15 parts) t-butanol and 189 g. of "Sipex ESY" (26% A.I.) (7 parts water, 2.45 parts active ingredient). The reactor was sealed, purged, and ethylene was admitted to a pressure of 900 lb./sq. in. The charge was heated to 80° C., a solution consisting of 5.0 g. (0.25 part) of potassium persulfate in 100 g. (5 parts) of distilled water was pumped in and the pressure was adjusted to 4800 lb./sq. in. The temperature was maintained between 74 and 90° C. and the pressure at 4500–4800 lb./sq. in. During the course of 3 hours and 45 minutes the total solids content of the reactor charge increased to 24.0%, when the reaction was terminated by shutting off the ethylene supply, stopping the agitator and discharging the reactor contents through the dip tube into an open container. The product was a fluid opaque latex with a trace of prefloc. The product was concentrated to 34.0 percent solids without separation of any solids. The Brookfield viscosity of the latex was 14.5 centipoises and the surface tension, 67.3 dynes/cm. It failed the Waring blendor mechanical stability test. No solids have separated from this latex after 9 months' storage.

Example 5

A 1-gallon reactor of the type described in Example 3 was loaded with the following materials: distilled water, 1600 g. (80 parts); tertiary butanol, 300 g. (15 parts); Duponol WAQE (a 30 percent active solution of sodium lauryl sulfate), 40 g. (2 parts). The reactor was sealed, purged, pressured to 1000 lb./sq. in. with ethylene and heated to 80° C. A solution of 4.8 g. (0.25 part) of potassium persulfate dissolved in 95.2 g. (5 parts) of water was pumped in and the pressure was adjusted to 3000 lb./sq. in. and maintained at 2100–3000 lb./sq. in. during the subsequent reaction. The temperature rose to a maximum of 102° C. during the polymerization because of the exothermic reaction and was prevented from going higher by intermittently running tap water through a cooling coil in the reactor. After 1.2 hours the total solids content of the charge was 21.5 percent and the reaction was terminated by the procedure described in Example 3. The product was a fluid translucent latex with no visible solid particles. The pH was 4.0. It was stripped and concentrated to 29.9 percent total solids. Polymer recovered from the latex exhibited the following properties: density, 0.9170 g./ml.; melt index, 320; inherent viscosity, 0.794, corresponding to a molecular weight of 23,000.

Example 6

The autoclave described in Example 1 was charged with a solution composed of 64 lb. (80 parts) of distilled water, 12 lb. (15 parts) of tertiary butanol, 1.76 lb. (2.2 parts) of stearic acid, 0.42 lb. (0.53 part) of potassium hydroxide and 4 lb. (0.5 part) of tripotassium phosphate. Purging and operating procedures were the same as those described in Example 1. The persulfate solution consisted of 0.049 lb. (0.061 part) of potassium persulfate dissolved in 4 lb. (5 parts) of distilled water. The pressure was maintained at 2500 lb./sq. in. and the temperature at 80° C. during the run. After 4 hours the total solids content of the latex had reached 25.6 percent and the reaction was terminated and the product was discharged. The product was a translucent fluid latex with no cream or sediment present. Polymer recovered from the latex exhibited the following properties: melt index, 1200; inherent viscosity, 0.513, corresponding to a molecular weight of 15,300.

Example 7

The autoclave described in Example 1 was charged with a solution composed of 76 lb. (95 parts) of distilled water, 1.76 lb. (2.2 parts) of stearic acid, 0.42 lb. (0.53 part) of potassium hydroxide and 4 lb. (0.5 part) of tripotassium phosphate. Purging and operating procedures were the same as those described in Example 1. The persulfate solution consisted of 0.096 lb. (0.12 part) of potassium persulfate dissolved in 4 lb. (5 parts) of distilled water. The pressure was maintained at 3000 lb./sq. in. and the temperature at 80° C. during the run. After 3 hours the total solids content of the latex had reached 25 percent and the product was discharged. The product was a fluid latex containing some prefloc. Polymer recovered from this latex exhibited a melt index of 690, a density of 0.9300 g./ml., and an inherent viscosity of 0.690 corresponding to a molecular weight of 21,000.

Example 8

The following materials were placed in the 1-gallon autoclave described in Example 3: distilled water, 1560 g. (78 parts); tertiary butanol, 400 g. (20 parts); potassium hydroxide, 12.5 g. (0.53 part); stearic acid, 44.2 g. (2.2 parts); tripotassium phosphate, 5.0 g. (0.25 part). The reactor was sealed, purged and brought to reaction temperature and pressure as described in Example 3. The initiator solution consisted of 2 g. (0.10 part) of potassium persulfate dissolved in 40 g. (2 parts) of distilled water. The polymerization was conducted at 76–87° C. and 3900–4500 lb./sq. in. pressure. At 2.9 hours the contents of the reactor had attained 24.8 percent total solids and were discharged. The product was a fluid, white latex. The latex was stripped and concentrated to 29.6 percent total solids in a rotating flask at a pressure of 40 mm. of mercury. The stripped latex has not thickened, gelled or creamed after 10 months' storage. Polymer recovered from the latex had the following properties: crystalline melting point, 99–103° C.; melt index, 320; density, 0.9295 g./ml.; inherent viscosity, 0.729 corresponding to a molecular weight of 22,000.

Example 9

The 1-gallon reactor described in Example 3 was loaded with the following materials: distilled water, 1820 g. (91 parts); tertiary butanol, 100 g. (5 parts); potassium hydroxide, 12.2 g. (0.61 part); myristic acid, 42.6 g. (2.13 parts); tripotassium phosphate, 10.0 g. (0.5 part). The pH of this charge was 11.8. The reactor was sealed, purged and brought up to operating temperature and pressure as in Example 3. The persulfate charge consisted of 4 g. (0.2 part) of potassium persulfate dissolved in 80 g. (4 parts) of distilled water. The temperature was maintained at 81–88° C. and the pressure at 2600–3000 lb./sq. in. After 3.1 hours the total solids content of the latex had reached 25.4 percent and the reactor was discharged as in Example 4. The product was a bluish-white latex with no visible solid particles. The pH was 8.4. After standing on the shelf for 1 year the latex has not thickened, creamed or gelled. A portion of the latex was stripped and concentrated in a rotating flask at a pressure of 20 mm. of mercury to a total solids content of 32.8 percent. The Brookfield viscosity of the stripped latex at 25° C. was 410 centipoises at 12 r.p.m. with spindle 1. After 1 year it has not thickened, creamed, or gelled. Polymer recovered from the latex exhibited the following properties: crystalline melting point, 82–83° C.; melt index, 400; density, 0.9124; inherent viscosity, 0.454, corresponding to a molecular weight of 13,000. The polymer was analyzed for sulfur and contained 0.095 percent. After further washing, re-analysis gave a sulfur content of 0.047% indicating that sulfur was present as water-soluble occluded inorganic sulfur.

Example 10

A 1-gallon reactor was charged according to the procedures of Example 3. About 20 minutes after the addition of initiator solution the temperature had risen from 80 to 90° C. and at that time it was lowered to 70° C. and maintained at 70–73° C. for the next three hours, by which time the total solids content had reached about 23 percent. At 3.0 hours an incremental charge of persulfate solution amounting to 25 percent of the initial persulfate solution was pumped in. At about 3¾ hours the temperature was increased to 75° C. and during the final 30 minutes it was brought up to 83° C. Pressure was maintained at 2400–3000 lb./sq. in throughout the reaction. After about 4¾ hours total reaction time the reactor was discharged. The product was a translucent, fluid latex with a total solids content of 24.1 percent. Polymer recovered from the latex exhibited the following properties: density 0.9159 g./ml.; melting point, 97–100° C.; melt index, 620; intrinsic viscosity, 0.656, corresponding to a molecular weight of 19,000.

Example 11

The 1-gallon "Magne-Dash" reactor described in Example 3 was charged with 1475 grams of water, 300 grams of t-butanol (85 and 15 parts, respectively, correcting for water in the initiator solution and Sipex) and 194 grams of Sipex TDS (20% solution of sodium tridecyl sulfate, 2.9 parts) and sealed. The reactor was purged with ethylene, the temperature increased to 80° C. with agitation and a solution containing 5.0 grams of potassium persulfate (0.25 part) in 100 mls. of water was pumped in. The pressure was adjusted to 4800 p.s.i. with ethylene and maintained there by intermittent additions of ethylene from a high pressure reservoir.

The temperature was kept between 76 and 88° C. and the extent of polymerization followed by periodic determinations of solids content. The reactor contents were discharged after 2.1 hours as described in Example 4. The product was a bluish-white latex of 23.8 percent total solids and contained no prefloc. A portion of the latex was stripped to 39.4 percent solids with no separation of solids. The surface tension was 55 dynes/cm. and viscosity, 14.5 centipoises. After 9 months' storage, the latex surface contains some floating flakes, but the latex is unchanged in other respects. Solid polymer isolated from the latex had an inherent viscosity of 0.263, melt index of 2900, density of 0.9169 and a crystalline melting point of 93 to 96° C.

Example 12

The autoclave described in Example 1 was charged with a solution composed of 66 pounds (82.5 parts) of distilled water, 10 pounds (12.5 parts) of tertiary butanol, 1.42 pounds (1.77 parts) of myristic acid, 0.41 pound (0.51 part) of potassium hydroxide, 0.34 pound (0.42 part) of tripotassium phosphate. The purging and operating procedures were the same as those described in Example 1. The persulfate solution consisted of 0.096 pound of potassium persulfate (0.12 part) dissolved in 4 pounds (5 parts) of distilled water. The pressure was held at 3000 pounds per square inch and the temperature at 80–97° C. during the polymerization. After 1.2 hours the charge had attained a total solids content of 21.0 percent and it was discharged. The product was a translucent fluid latex containing no cream or visible solid particles. It was stripped of tertiary butanol and concentrated to 38.4 percent solids by the procedure described in Example 1. The stripped product was a fluid, milky latex having a surface tension of 68.4 dynes/cm. The average particle diameter of this latex was 0.036 micron. The latex shows no gelling, creaming, or thickening in a period of 10 months since its preparation. Polymer recovered from the latex exhibited the following properties: density, 0.9197 g./ml.; melt index, 710; inherent viscosity, 0.598, corresponding to a molecular weight of 17,000. An infrared spectrogram showed that there were 34 methyl groups present per 1000 carbon atoms.

Example 13

The autoclave described in Example 1 was charged with a solution composed of 63.6 pounds (79.5 parts) of distilled water, 12.4 pounds (15.5 parts) of tertiary butanol, 0.872 pound (1.09 parts) of myristic acid, 0.254 pound (0.318 part) of potassium hydroxide, and 0.34 pound (0.42 part) of tripotassium phosphate. The purging and operating procedures were the same as those described in Example 1. The persulfate solution consisted of 0.096 pound (0.12 part) of potassium persulfate dissolved in 4 pounds (5 parts) of distilled water. The pressure was maintained at 3000 pounds per square inch and the temperature at 80° C. during the polymerization. After 2.0 hours the charge had attained a total solids content of 26.4 percent and it was discharged. The product was a milky, fluid latex containing no cream or visible solid particles. It was stripped of tertiary butanol and concentrated to 36.4 percent total solids by the procedure described in Example 1. The stripped product was a fluid, white latex with a surface tension of 69.9 dynes/cm. The latex shows no gelling, creaming or thickening in a period of 10 months since its preparation. The average particle diameter of this latex was 0.079 micron. Polymer recovered from the latex exhibited the following properties: density, 0.923 g./ml.; inherent viscosity, 0.994, corresponding to a molecular weight of 30,000. An infrared spectrogram showed that there were 26 methyl groups present per 1000 carbon atoms.

We claim:

1. A reactor-stable and shelf-stable polyethylene latex comprising a plurality of emulsified solid particles of a hydrophobic, substantially oxygen-free, substantially sulfur-free polyethylene, said particles being of an average size between about 0.02 micron and about 0.5 micron, suspended in an aqueous medium comprising water and from about 0.9 to about 9 percent, by weight of the aqueous medium, of an anionic emulsifier selected from the group consisting of a (1) salt of a saturated fatty acid having 12–18 carbon atoms in combination with a pH adjuster maintaining the pH of said aqueous medium above about 8.5, (2) a salt of a sulfate of a saturated fatty alcohol having about 12–18 carbon atoms, and (3) a salt of a sulfate of an ethoxylated saturated fatty alcohol containing 12–18 carbon atoms and an average number of ethoxy groups between 1 and 5.

2. A polyethylene latex as in claim 1 wherein said polyethylene has an inherent viscosity between about 0.25 and about 1.1.

3. A polyethylene latex as in claim 1 having a polyethylene solids content of at least about 40 percent by weight of the latex.

4. A polyethylene latex as in claim 1 wherein said emulsifier is a salt of a saturated fatty acid having 12–18 carbon atoms and is used in combination with a pH adjuster maintaining the pH of said mixture above about 8.5.

5. A polyethylene latex as in claim 4 wherein said polyethylene has an inherent viscosity between about 0.25 and about 1.1.

6. A polyethylene latex as in claim 1 wherein said emulsifier is a salt of a sulfate of a saturated fatty alcohol having about 12–18 carbon atoms.

7. A fluid, reactor-stable, strip-stable, and shelf-stable ethylene emulsion polymerization product in the form of an anionically emulsified polyethylene latex containing from about 20 percent to about 30 percent by weight of emulsified solid particles of a hydrophobic, substantially oxygen-free, substantially sulfur-free polyethylene in an aqueous medium comprising water and an anionic emulsifier, said particles having an average size between about 0.02 micron and about 0.5 micron, said anionic emulsifier being present in amounts from about 0.9 to about 9 percent, by weight of the aqueous medium, and being selected from the group consisting of (1) a salt of a saturated fatty acid having 12–18 carbon atoms in combination with a pH adjuster maintaining the pH of said aqueous medium above about 8.5, (2) a salt of a sulfate of a saturated fatty alcohol having about 12–18 carbon atoms, and (3) a salt of a sulfate of an ethoxylated saturated fatty alcohol containing 12–18 carbon atoms and an average number of ethoxy groups between 1 and 5.

8. A polymerization product as in claim 7 wherein said polyethylene has an inherent viscosity between about 0.25 and about 1.1.

9. A fluid, reactor-stable, strip-stable, and shelf-stable ethylene emulsion polymerization product in the form of an anionically emulsified polyethylene latex containing from about 20 percent to about 30 percent by weight of solid particles of an emulsified hydrophobic, substantially oxygen-free, substantially sulfur-free polyethylene in an aqueous medium comprising water, t-butanol, and an anionic emulsifier, said particles having an average size between about 0.02 micron and about 0.5 micron, said t-butanol being present in amounts from about 5 to about 25 percent by weight of the aqueous medium, said anionic emulsifier being present in amounts from about 0.9 to about 9 percent, by weight of the aqueous medium, and being selected from the group consisting of (1) a salt of a saturated fatty acid having 12–18 carbon atoms in combination with a pH adjuster maintaining the pH of said aqueous medium above about 8.5, (2) a salt of a sulfate of a saturated fatty alcohol having about 12–18 carbon atoms, and (3) a salt of a sulfate of an ethoxylated saturated fatty alcohol containing 12–18 carbon atoms and an average number of ethoxy groups between 1 and 5.

10. A polymerization product as in claim 9 wherein said polyethylene has an inherent viscosity between about 0.25 and about 1.1.

11. A process for the preparation by emulsion polymerization of a fluid, reactor-stable, strip-stable, and shelf-stable anionically emulsified polyethylene latex, which process comprises polymerizing ethylene at temperatures between about 70° C. and about 100° C. and at pressures between about 2100 pounds per square inch and about 5000 pounds per square inch in the presence of an aqueous medium consisting essentially of water, a persulfate initiator not exceeding about 0.5 percent by weight of the aqueous medium, and from about 0.9 to about 9 percent by weight of the aqueous medium of a member selected from the group consisting of (1) a salt of a saturated fatty acid having 12–18 carbon atoms in combination with a pH adjuster maintaining the pH of said aqueous medium above about 8.5, (2) a salt of a sulfate of a saturated fatty alcohol having about 12–18 carbon atoms, and (3) a salt of a sulfate of an ethoxylated saturated fatty alcohol containing 12–18 carbon atoms and an average number of ethoxy groups between 1 and 5.

12. A process as in claim 11 wherein said initiator is present in an amount from about 0.06 to 0.5 per cent by weight.

13. A process as in claim 12 wherein said persulfate initiator is potassium persulfate.

14. A process for the preparation by emulsion polymerization of a fluid, reactor-stable, strip-stable, and shelf-stable anionically emulsified polyethylene latex, which process comprises polymerizing ethylene at temperatures between about 70° C. and about 100° C. and at pressures between about 2100 pounds per square inch and about 5000 pounds per square inch in the presence of an aqueous medium consisting essentially of water, from about 5 to about 25 per cent of t-butanol by weight of the aqueous medium, a persulfate initiator not exceeding about 0.5 percent by weight of the aqueous medium, and from about 0.09 to about 9 percent by weight of the aqueous medium of a member selected from the group consisting of (1) a salt of a saturated fatty acid having 12–18 carbon atoms in combination with a pH adjuster maintaining the pH of said aqueous medium above about 8.5, (2) a salt of a sulfate of a saturated fatty alcohol having about 12–18 carbon atoms, and (3) a salt of a sulfate of an ethoxylated saturated fatty alcohol containing 12–18 carbon atoms and an average number of ethoxy groups between 1 and 5.

15. A process as in claim 14 wherein said initiator is present in an amount from about 0.06 to 0.5 percent by weight.

16. A process as in claim 15 wherein said persulfate initiator is potassium persulfate.

References Cited by the Examiner

UNITED STATES PATENTS

| | | | |
|---|---|---|---|
| 2,456,265 | 12/1948 | Frolich | 260—23 |
| 2,653,919 | 9/1953 | Hunter et al. | 260—23 |
| 2,739,058 | 3/1956 | O'Flynn et al. | 260—23 |

FOREIGN PATENTS

| | | |
|---|---|---|
| 473,116 | 4/1951 | Canada. |
| 798,565 | 7/1958 | Great Britain. |

LEON J. BERCOVITZ, *Primary Examiner.*

MILTON STERMAN, *Examiner.*